(12) United States Patent
Kuzucan

(10) Patent No.: US 12,407,216 B2
(45) Date of Patent: Sep. 2, 2025

(54) COUPLING ARRANGEMENT

(71) Applicant: Mehmet Bora Kuzucan, Oakville (CA)

(72) Inventor: Mehmet Bora Kuzucan, Oakville (CA)

( * ) Notice: Subject to any disclaimer, the term of this patent is extended or adjusted under 35 U.S.C. 154(b) by 450 days.

(21) Appl. No.: 18/009,753

(22) PCT Filed: Jun. 10, 2020

(86) PCT No.: PCT/ZA2020/050031
§ 371 (c)(1),
(2) Date: Dec. 12, 2022

(87) PCT Pub. No.: WO2021/253059
PCT Pub. Date: Dec. 16, 2021

(65) Prior Publication Data
US 2023/0349417 A1  Nov. 2, 2023

(51) Int. Cl.
*H02K 7/00* (2006.01)

(52) U.S. Cl.
CPC .................................... *H02K 7/003* (2013.01)

(58) Field of Classification Search
CPC .. F16C 19/546; F16C 2361/41; F16C 35/067; F16D 1/06
See application file for complete search history.

(56) References Cited

FOREIGN PATENT DOCUMENTS

AT           411388 B  * 11/2003  .............. F23K 3/14

OTHER PUBLICATIONS

AT-411388-B English Machine Translation (Year: 2003).*

* cited by examiner

*Primary Examiner* — Anthony Ayala Delgado
(74) *Attorney, Agent, or Firm* — Rimon Law, P.C.

(57) ABSTRACT

A coupling arrangement for coupling a driving means, typically a motor, to a hollow rotor and stationary shaft combination, which arrangement includes a rotor having a working formation and hollow cylindrical member extending axially from a shoulder formation (not shown) at one end of the working formation, the member provided with a thread (not shown) on its outside, which, in use is threaded into a complementary cylindrical hollow part of the motor and wherein the threads have a tightening direction which is the same as the direction of the motor, such that in use, when the motor drives the member, the member is tightened onto the rotor.

8 Claims, 2 Drawing Sheets

COUPLING ARRANGEMENT

TECHNICAL FIELD

This invention relates to a coupling arrangement. In particular this invention relates to a coupling arrangement for a rotor that rotates about a stationary shaft.

SUMMARY OF THE INVENTION

According to the invention, there is provided a coupling arrangement for coupling a driving means to a hollow rotor and stationary shaft combination, which arrangement includes:—
- a rotor having a working formation and hollow cylindrical member extending axially from a shoulder formation at one end of the working formation, the member provided with a thread on its outside, which, in use is threaded into a complementary cylindrical hollow part of the driving means and wherein the threads have a tightening direction which is the same as the direction of the driving means, such that in use, when the driving means drives the member, the member is tightened onto the rotor;
- a lateral force transferral means for laterally transferring force from an end of the cylindrical hollow part of the driving means to the shoulder formation of the rotor, which lateral force transferring means includes a combination of one or more of abutting sleeves and radial bearings; and
- at least two roller bearings mounted inside the hollow cylindrical member between the member and a stationary shaft, which bearings are positioned opposite the cylindrical hollow part of the driving means and its abutting sleeve and bearing combination on the outside of the cylindrical member.

It is to be appreciated that the coupling arrangement allows coupling to a hollow rotor or a rotor provided with an axial cylindrical cavity while it is resistant to vibrations and wobble.

The member may be manufactured from any suitable material such as steel, preferably the same material the hollow rotor.

The driving means may be in the form of any suitable driving means and may be in the form of a belt drive, chain drive or motor, preferably a motor. It is to be appreciated that the driving means is mounted directly on the rotor and there are no transmission losses.

The shaft may be manufactured from any suitable material, preferably mild steel.

The sleeves may be located on either side of the radial bearing. The sleeves and radial bearings may also bear the friction between the rotor and a housing. It is to be appreciated that an outer portion of the sleeves and radial bearings may be fixed to the housing to prevent rotation thereof relative to the housing whereas an inner portion of the radial bearings may be free to allow rotation thereof relative to the housing, thus allowing the rotor to rotate relative to the housing. The sleeves may be manufactured from any suitable material, preferably steel.

BRIEF DESCRIPTION OF THE DRAWINGS

A coupling arrangement in accordance with the invention will now be described by way of the following, non-limiting examples with reference to the accompanying drawings.

In the drawings:—

DETAILED DESCRIPTION OF THE INVENTION

Figure 1:
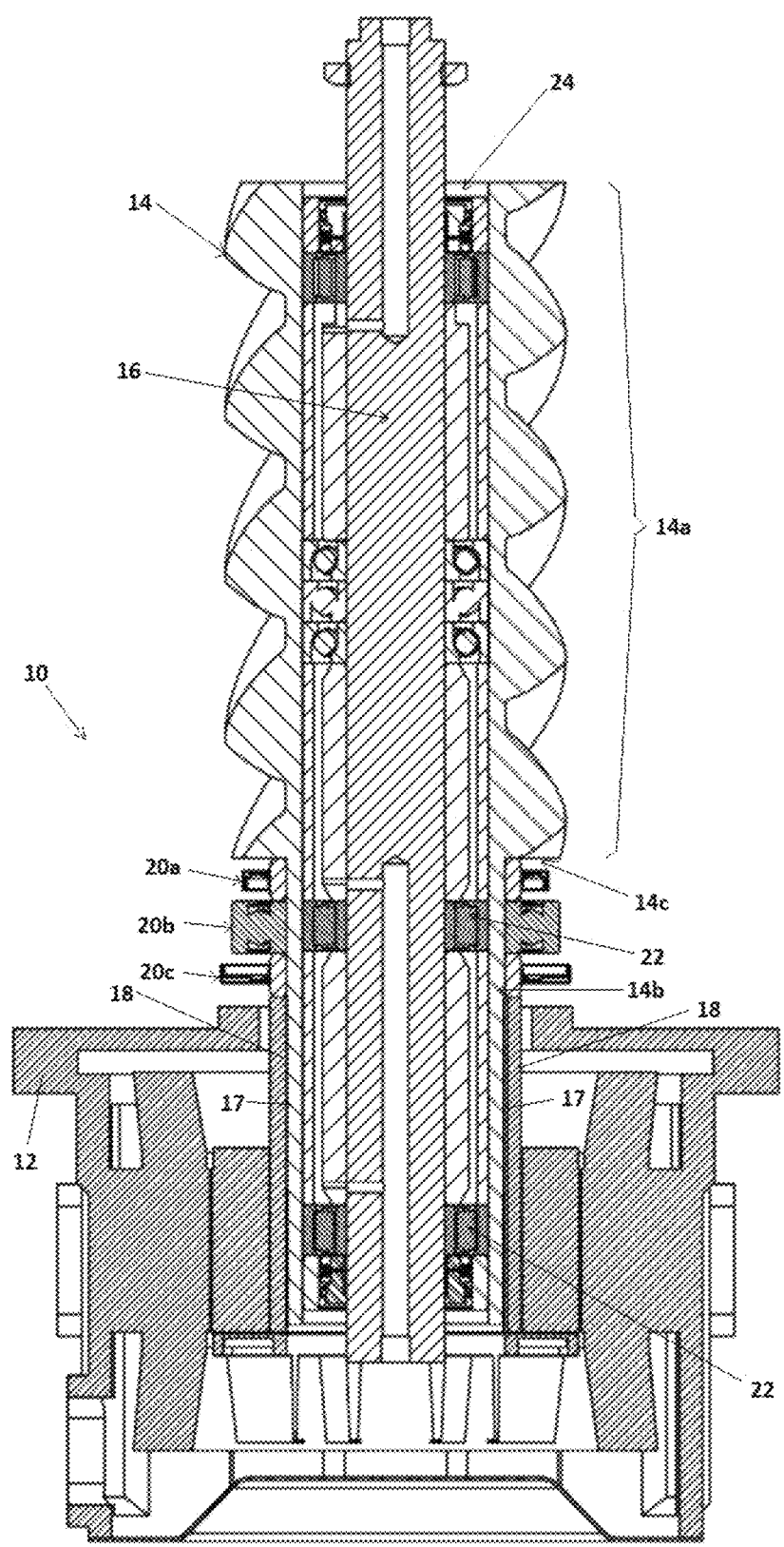
FIG. 1 is a cross-section of the coupling arrangement mounted on a rotor and coupling a driving means to the rotor.
Figure 2:
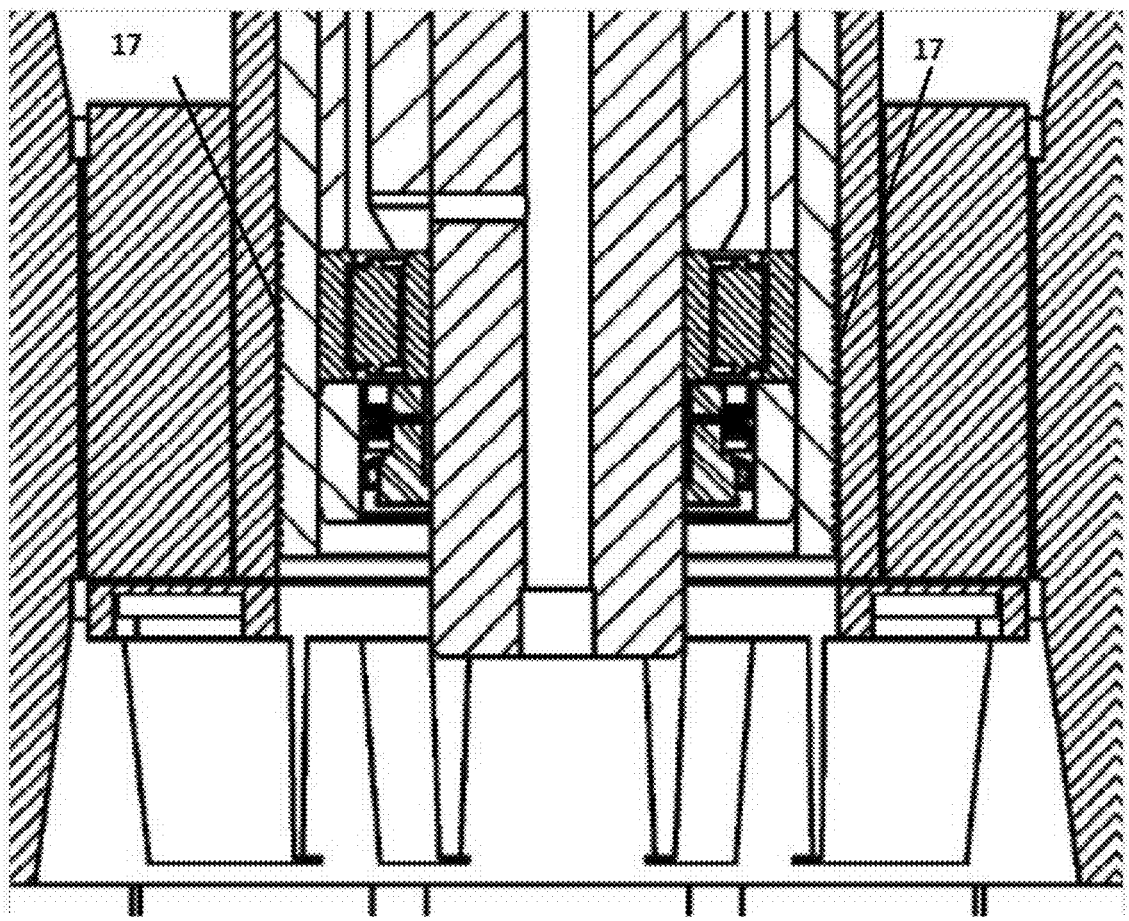
FIG. 2 is an enlarged cross-section of a portion of the coupling arrangement of FIG. 1 showing a thread provided on a member thereof.

Referring now to the drawing reference numeral 10 refers generally to a coupling arrangement for coupling a driving means, typically a motor 12, to a hollow rotor 14 and stationary shaft 16 combination, which arrangement includes a rotor 14 having a working formation 14*a* and hollow cylindrical member 14*b* extending axially from a shoulder formation 14*c* at one end of the working formation 14*a*, the member 14*b* provided with a thread 17 on its outside (see FIG. 2), which, in use is threaded into a complementary cylindrical hollow part 18 of the motor 12 and wherein the threads have a tightening direction which is the same as the direction of the motor 12, such that in use, when the motor 12 drives the member 14*b*, the member 14*b* is tightened onto the rotor 14, a lateral force transferral means 20 for laterally transferring force from an end (not shown) of the cylindrical hollow part 18 of the motor 12 to the shoulder formation (not shown) of the rotor 14, which lateral force transferring means 20 includes a combination of one or more of abutting sleeves 20*a*,20*c* and radial bearings 20*b*, and at least two roller bearings 22 mounted inside the hollow cylindrical member 14*b* between the member 14*b* and a stationary shaft 16, which bearings 22 are positioned opposite the cylindrical hollow part 18 of the motor 12 and its abutting sleeve 20*a*,20*c* and bearing 20*b* combination on the outside of the cylindrical member 14*b*.

It is to be appreciated that the coupling arrangement 10 allows coupling to a hollow rotor 14 or a rotor 14 provided with an axial cylindrical cavity 24 while it is resistant to vibrations and wobble.

It is to be appreciated that the motor 12 is mounted directly on the rotor 14 and there are no transmission losses.

The shaft 16 is manufactured from mild steel.

The sleeves 20*a*,20*c* are located on either side of the radial bearing 20*b*. The sleeves 20*a*,20*c* and radial bearing 20*b* also bear the friction between the rotor 14 and a housing (not shown). It is to be appreciated that an outer portion (not shown) of the sleeves 20*a*,20*c* and radial bearing 20*b* is fixed to the housing (not shown) to prevent rotation thereof relative to the housing (not shown) whereas an inner portion (not shown) of the sleeves 20*a*,20*c* and radial bearing 20*b* is free to allow rotation thereof relative to the housing (not shown), thus allowing the rotor 14 to rotate relative to the housing (not shown). The sleeves 20*a*,20*c* are manufactured from steel.

In use, the coupling arrangement 10 couples the motor to an end portion of a male rotor of a male rotor assembly in a compressor for compressing a fluid (not shown). The male rotor assembly includes an elongate male helical-shaped rotor having an axial cylindrical cavity therethrough, a stationary shaft axially aligned with the male rotor and through the cavity, a housing for housing the male rotor and its associated stationary shaft therein wherein the shaft is fixed within the housing 20 for preventing rotation thereof relative to the housing, and bearing means mounted within the cavity of the male rotor for bearing the friction between the rotor and the shaft as the male rotor, which is driven by the motor, rotates about the stationary shaft. The compressor also includes a female rotor assembly including an elongate female helical-shaped rotor having an axial cylindrical cavity therethrough, which is in register with the male rotor, a stationary shaft axially aligned with the female rotor and through the cavity, wherein the housing also houses the female rotor and its associated stationary shaft therein wherein the shaft is fixed within the housing for preventing rotation thereof relative to the housing, and bearing means mounted within the cavity of the female rotor for bearing the friction between the rotor and the shaft as the rotor rotates about the stationary shaft, when driven by the male rotor. The complementary helix formations define cavities between the male and female formations which capture, drive and compress a fluid substance forward when the rotors are driven.

It is, of course, to be appreciated that the coupling arrangement 10 in accordance with the invention is not limited to the precise constructional and functional details as hereinbefore described with reference to the accompanying drawings and which may be varied as desired.

Although only certain embodiments of the invention have been described herein, it will be understood by any person skilled in the art that other modifications, variations, and possibilities of the invention are possible. Such modifications, variations and possibilities are therefore to be considered as falling within the spirit and scope of the invention and hence form part of the invention as herein described and/or exemplified. It is further to be understood that the examples are provided for illustrating the invention further and to assist a person skilled in the art with understanding the invention and is not meant to be construed as unduly limiting the reasonable scope of the invention.

The coupling arrangement 10 in accordance with the present provides a coupling arrangement for coupling a drive to a hollow rotor and stationary shaft combination.

The invention claimed is:

1. A coupling arrangement for coupling a driving means to a hollow rotor and stationary shaft combination, which arrangement comprises:—
    a rotor having a working formation and hollow cylindrical member extending axially from a shoulder formation at one end of the working formation, the member provided with a thread on its outside, which, in use is threaded into a complementary cylindrical hollow part of the driving means and wherein the threads have a tightening direction which is the same as the direction of the driving means, such that in use, when the driving means drives the member, the member is tightened onto the rotor;
    a lateral force transferral means for laterally transferring force from an end of the cylindrical hollow part of the driving means to the shoulder formation of the rotor, which lateral force transferring means comprises a combination of one or more of abutting sleeves and radial bearings; and
    at least two roller bearings mounted inside the hollow cylindrical member between the member and a stationary shaft, which bearings are positioned opposite the cylindrical hollow part of the driving means and its abutting sleeve and bearing combination on the outside of the cylindrical member.

2. A coupling arrangement as claimed in claim 1 wherein the member is manufactured from steel.

3. A coupling arrangement as claimed in claim 1 wherein the driving means is in the form of a motor.

4. A coupling arrangement as claimed in claim 1 wherein the shaft is manufactured from mild steel.

5. A coupling arrangement as claimed in claim 1 wherein the sleeves are located on either side of the radial bearing.

6. A coupling arrangement as claimed in claim 1 wherein the sleeves and radial bearings bear the friction between the rotor and a housing.

7. A coupling arrangement as claimed in claim 6 an outer portion of the sleeves and radial bearings is fixed to the housing to prevent rotation thereof relative to the housing whereas an inner portion of the radial bearings is free to allow rotation thereof relative to the housing, thus allowing the rotor to rotate relative to the housing.

8. A coupling arrangement as claimed in claim 1 wherein the sleeves are manufactured from steel.

* * * * *